United States Patent [19]

Rudolf

[11] Patent Number: 4,545,660

[45] Date of Patent: Oct. 8, 1985

[54] CAMERA HANDLE WITH RETRACTABLE BIPOD SUPPORT

[76] Inventor: Alain Rudolf, 12 Rue Vivienne, Paris 2ème, France, 75002

[21] Appl. No.: 609,278

[22] Filed: May 10, 1984

[30] Foreign Application Priority Data

May 27, 1983 [FR] France ................... 83 08782

[51] Int. Cl.$^4$ ............................................. G03B 17/00
[52] U.S. Cl. .................................... 354/82; 354/293; 248/171; 248/177
[58] Field of Search ......................... 354/81, 82, 293; 248/169, 171, 177, 126

[56] References Cited

U.S. PATENT DOCUMENTS

| | | | |
|---|---|---|---|
| 1,803,534 | 5/1931 | Leevo | 248/126 |
| 2,763,456 | 9/1956 | Breer | 354/82 |
| 2,806,416 | 9/1957 | Jones | 354/82 |
| 2,926,591 | 3/1960 | Huffman | 354/82 |
| 3,002,663 | 10/1961 | Fernelius | 354/82 |
| 4,029,246 | 6/1977 | Woodruff | 354/293 |
| 4,121,799 | 10/1978 | Michio | 248/171 |
| 4,306,790 | 12/1981 | Adams | 354/293 |
| 4,437,753 | 3/1984 | Dunn | 248/169 |

*Primary Examiner*—A. A. Mathews
*Attorney, Agent, or Firm*—Kramer and Brufsky

[57] ABSTRACT

A handle body is provided with a bipod support which includes a tube pivotable into and out of the body and locked in an adjusted position. The tube contains a pair of retractable legs which when extended, aid in support of a camera connected to the handle body.

8 Claims, 7 Drawing Figures

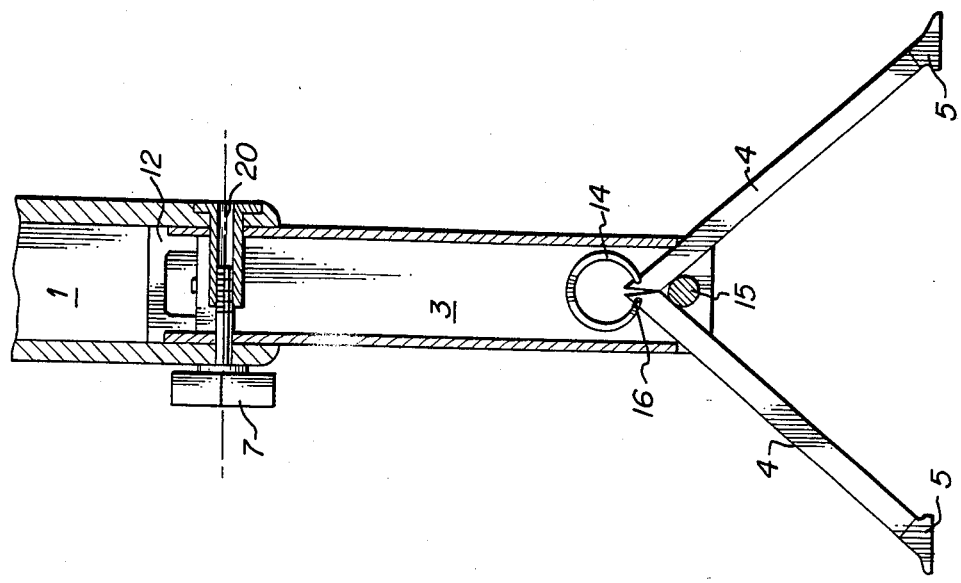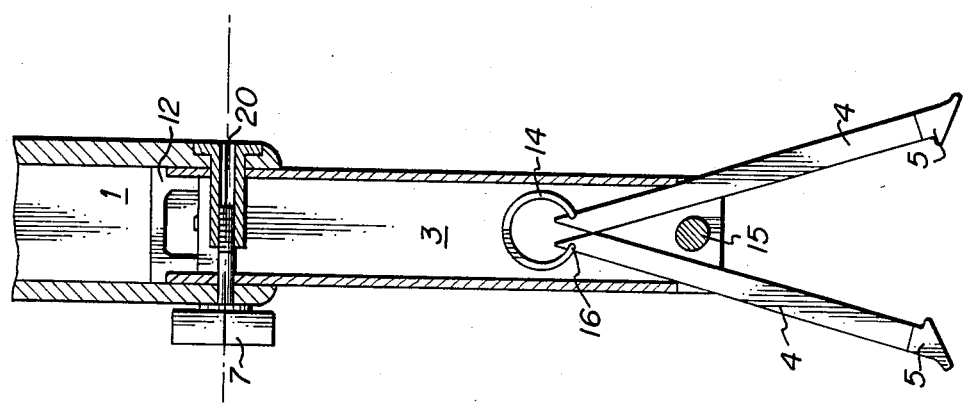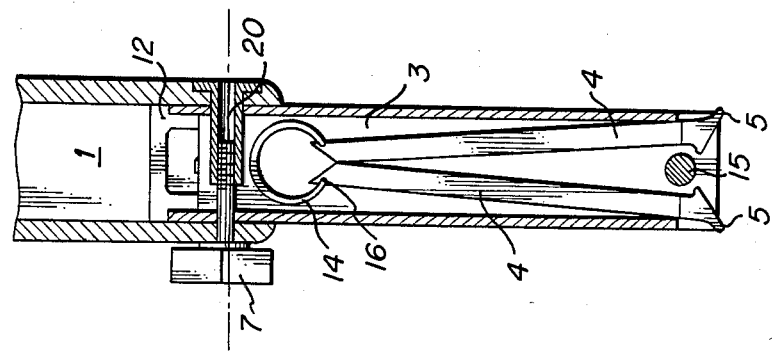

CAMERA HANDLE WITH RETRACTABLE BIPOD SUPPORT

This invention relates to an improvement in a camera handle having a retractable bipod support.

It is known that still cameras and motion picture or TV cameras have either a hand held handle or grip for carrying the camera. But the whole apparatus is heavy and cumbersome, which can involve handling problems and tiredness when travelling. Moreover, such devices do not always make it easier to take photographs or pictures.

In order to avoid these drawbacks, a bipod support for a camera was proposed in French patent application No. 8204966 filed Mar. 24, 1982. This bipod support can seat in the handle and can be placed on the chest of the operator when extended. Both support bases permit the user to firmly position the camera as he wishes avoiding fuzzy pictures. If the user wants to put the camera down on a supporting surface, the bipod and the handle make a steady tripod.

In order to diminish the bulkiness during travelling, the bipod support is retractable and slides inside the handle, so the operator can use the camera in any position without any constraint on the handle. On this handle, the operating buttons are placed in order to be used by a left-handed or a right-handed operator. The handle is built from a light cast material such as plastic or aluminum.

In the present invention, the camera handle with retractable bipod support is characterized in that the lightweight handle can be screwed on any camera, and there is provided a quickly retractable bipod that can be unfolded like a V which permits the operator to have two support bases on the chest.

The improvement of this invention concerns the functioning and the construction of the bipod support set in the camera handle and one that can emerge from the handle to stop at a steady position that is the maximum spacing of both support bases, (i.e., between the handle and the bipod), which spacing is also adjustable by the operator.

The invention is further characterized in that it is composed of a handle that can be screwed into the camera and contains a telescoping tube, retractable and pivotable from the handle that can be positioned and clamped in place by a screw component. Inside the tube are two legs linked by a spring that slide and emerge from the tube to form a steady bipod support which is held in the tube by means of a pin fixed on the tube. On the outside of the handle there are the operating buttons for the operation of the camera.

This improvement will be better understood with the annexed drawings that are illustrative:

FIG. 2 is a cross-sectional view through the bipod support tube with the legs of the support in fully extended position wherein the handle can form a tripod support for a camera;

FIGS. 4 and 5 are views similar to FIG. 2 which illustrate the successive steps and positions of the bipod legs as the legs are slid from the tube and completely unfolded.

Figure 1:
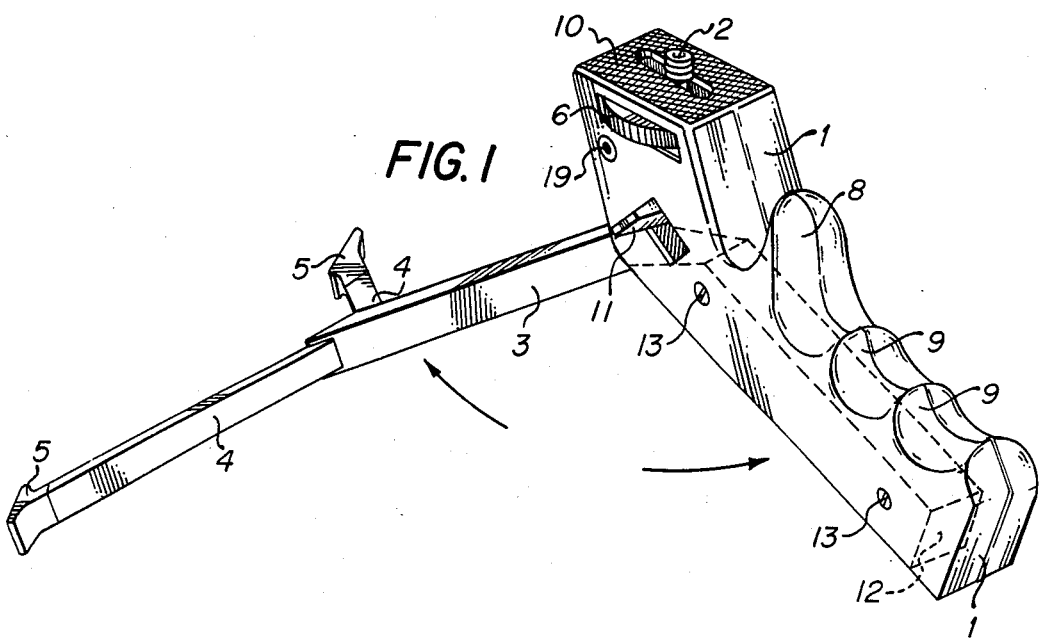
FIG. 1 is a perspective view of the whole handle device with the unfolded and extended bipod support.

FIG. 1 illustrates the whole device of the invention. The handle consists of two hollow parts forming a body (1) of cast plastic, for example. Both these hollow components or parts are held together by two threaded screws (13) so as to form a handle with fingergrips (9). On the top of the handle, the projection (8) constitutes a spur on which the forefinger can be placed. Inside the handle, there is a channel (12) in which is placed a square outer tube (3). This tube (3) is pivoted by means of a pin (20) positioned on the top of the handle inside channel (12). The tube (3) contains two legs (4) that are adapted to extend from the tube (3) to form a bipod support. On top of the handle is a board (10) on which is fixed a camera. The camera is fixed to the handle body (1) by means of a threaded wheel (6) that is screwed into a threaded hole which is provided on every camera. The size of the screw is chosen to be adaptable to any camera.

Generally, the camera shutter release is actuated by means of a push button or a flexible wire linked to the camera. On the handle body (1), a mechanical, spring-biased lever (11) is connected to actuate a flexible wire sold with the handle which is threaded into opening (19) on handle body (1) and the camera. The legs (4) of the bipod support are represented on this figure in an unfolded position in order to show the flexible legs that can be placed on the chest of the operator.

When travelling, the legs (4) of the bipod support are retractable inside the square tube (3) that can pivot to a position in the handle (1) in the channel (12). As illustrated in FIG. 2, the bipod support can be pivotably unfolded from the handle body (1) and the legs (4) taken completely out of the tube (3). The pivotable connection between the handle (1) and tube (3) is accomplished by means of a pin (20) into which is threaded a screw (7) accessible on the other side of the handle body (1). Both legs (4) are parallel inside the tube (3) and coupled by a circular leaf spring (14) whose ends are fixed to each of the legs (4) in a channel (16). The tube (3) is crossed at its bottom by a pin (15) that serves as a stop for the legs (4) when they slide along the tube (3), emerge, and unfold. The final form of the bipod support legs (4) is a 45° angle that is maintained under the urging of spring (14) that joins the top of both support legs (4) at channels (16). Flexible rubber feet (5) are joined to the bottom of each leg (4) at a 45° angle for comfortable support on a surface.

Figure 3:
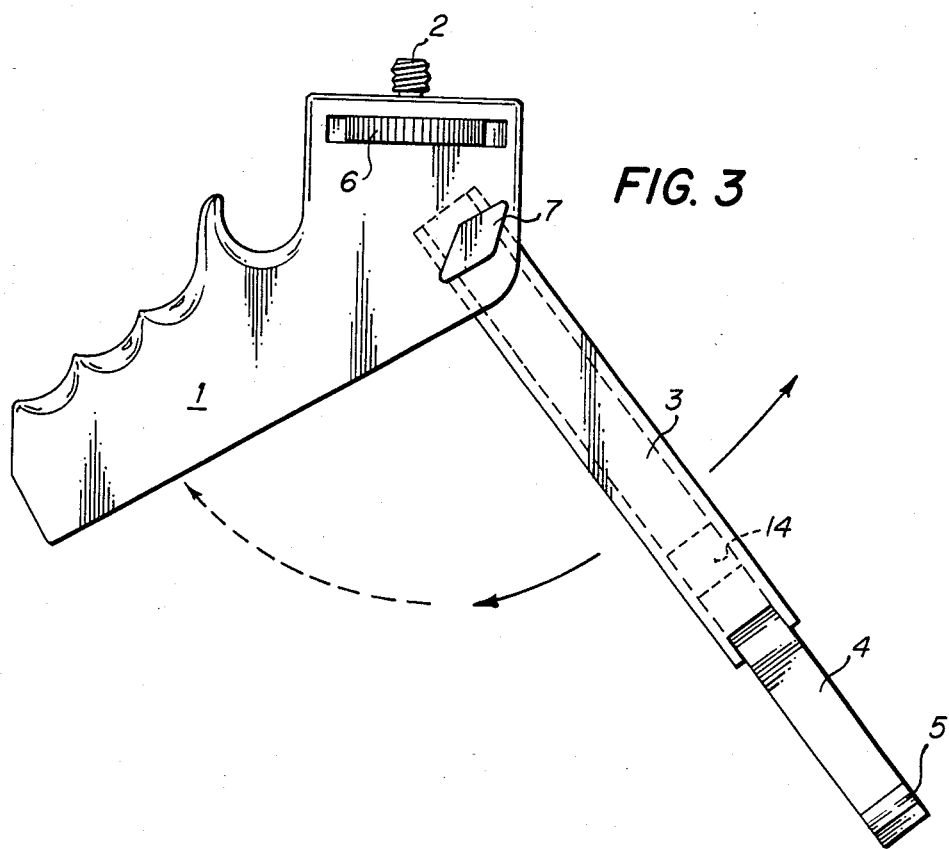
FIG. 3 represents a sideview in elevation of the bipod support tube and handle that illustrates the manner in which the tube and bipod support legs can be pivotably adjusted.

FIG. 3 illustrates the manner of moving and adjusting tube (3) when it is pivoted out of the handle (1). When the tube (3) is taken outside the handle (1), it is pivoted about pin (20) and its position can be adjustably fixed relative to handle body (1) by tightening the screw (7). This movement is reversible to position the tube (3) in the handle after using. The tube (3) carries both legs (4) of the bipod support that slide easily out of the tube (3) by pulling the feet (5).

FIGS. 4 and 5 illustrate how to pull out and extend the bipod support. Inside the tube (3) are both legs (4) that are linked by spring (14). Adjacent the spring (14), both legs (4) are bevelled according to a 45° angle. The spring (14) is set in the channels (16).

In FIG. 4, the legs (4) of the bipod support are inside the tube (3). When the legs (4) are slid out and spaced, movement will be stopped by pin (15) that is fixed to the bottom of tube (3).

In FIG. 5 both legs (4) are withdrawn from tube (3) and the spring (14) urges the legs apart as they are slid out of the tube (3) to form a V. The pin (15), fixed to the end of the tube (3), stops the end of legs (4) from sliding out of tube (3) and it is this last movement that is shown in FIG. 2.

Figure 6:
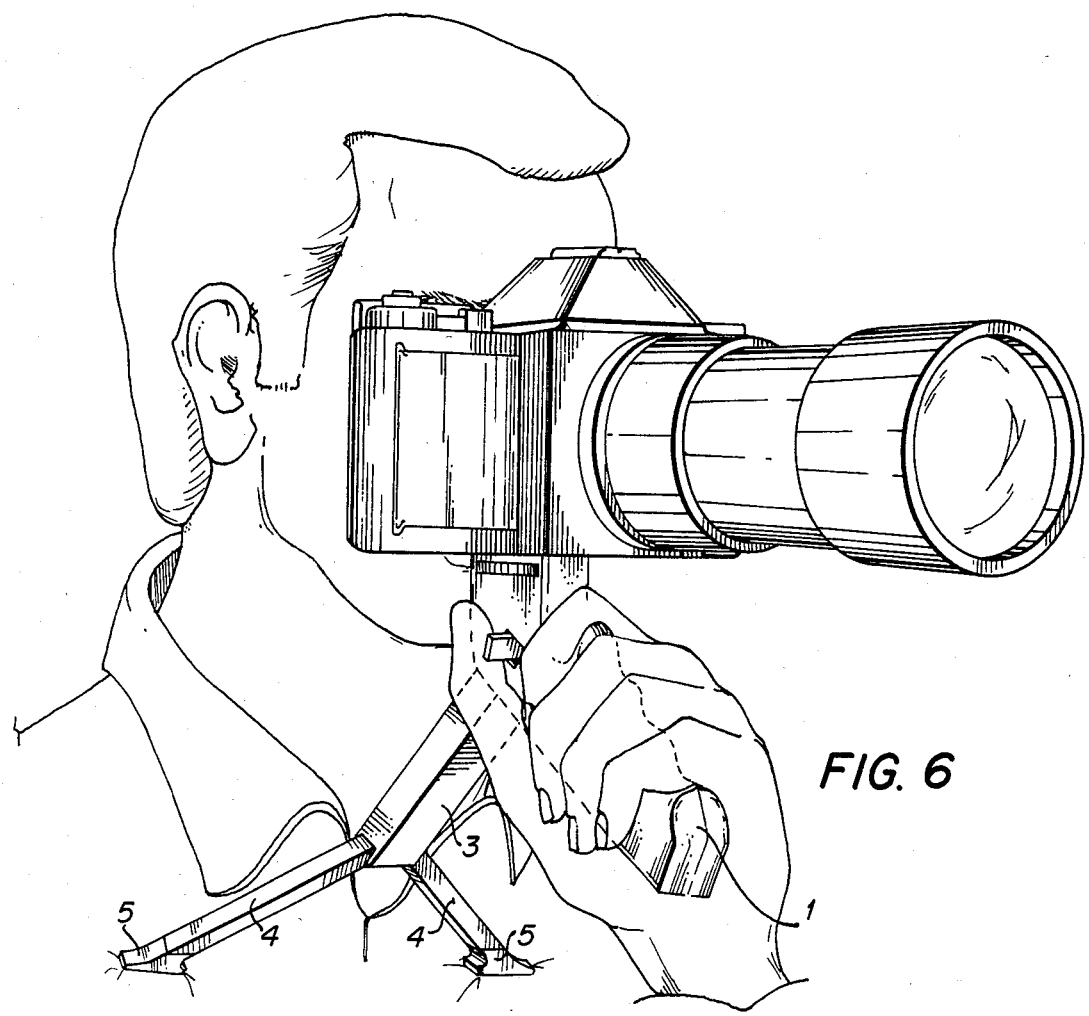
FIGS. 6 and 7 are perspective views of the handle and bipod in use.
Figure 7:
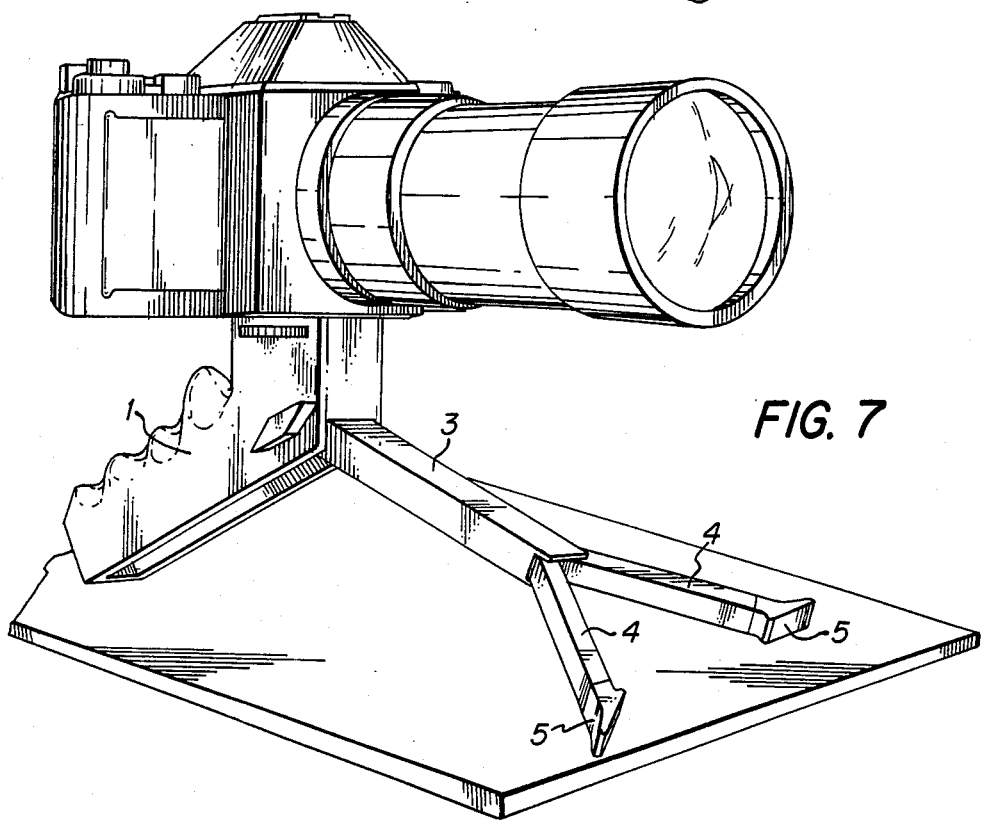

When the bipod support is unfolded, it can be used as a support on the chest, as illustrated in FIG. 6 or as part of a tripod as illustrated in FIG. 7 with the camera rotated. The support will not lose its extension because of legs (4) are wedged between pin (15) and the sides of tube (3), under the urging of spring (14).

I claim:

1. Handle apparatus adapted to be attached to a camera comprising:
    a handle body having a channel,
    a tube pivotably connected to said handle body for movement into and out of said channel,
    means between said handle body and tube for locking said tube in an adjusted pivoted position relative to said handle body, and
    a pair of relatively pivotable legs normally retractably housed within said tube, but slidable in telescoping relation to said tube to a use position exterior of said tube wherein they can be used as a bipod support,
    spring means connecting one end of each of said legs and biasing said legs away from each other to spread said legs as said legs are removed from said tube, and
    pin means across the bottom of said tube for limiting removal of said legs from said tube and in combination with said spring means causing each of said legs to wedge between said pin means and the bottom of said tube when said legs are fully removed thereupon.

2. The handle apparatus of claim 1 wherein each of said legs includes
    a foot member attached to the end thereof remote from said spring means.

3. Handle apparatus in accordance with claim 1 wherein said handle body includes a plurality of finger grips.

4. Handle apparatus in accordance with claim 1 wherein said locking means includes a hollow, internally threaded pin extending into said channel between one side of said handle body and tube receiving a threaded fastener therein disposed in said channel between the other side of said handle and tube.

5. Handle apparatus in accordance with claim 1 wherein said spring means includes a substantially circular leaf spring.

6. Handle apparatus in accordance with claim 1 wherein the ends of each of said legs connected by said leaf spring are bevelled.

7. Handle apparatus in accordance with claim 1 wherein said handle body, tube and legs are formed from plastic material.

8. Handle apparatus in accordance with claim 1 wherein said handle body, tube and legs are formed from aluminum.

* * * * *